(12) United States Patent
Puthoor et al.

(10) Patent No.: US 12,019,560 B2
(45) Date of Patent: Jun. 25, 2024

(54) VIRTUAL PARTITIONING A PROCESSOR-IN-MEMORY ("PIM")

(71) Applicant: ADVANCED MICRO DEVICES, INC., Santa Clara, CA (US)

(72) Inventors: Sooraj Puthoor, Austin, TX (US); Muhammad Amber Hassaan, San Marcos, TX (US); Ashwin Aji, Santa Clara, CA (US); Michael L. Chu, Santa Clara, CA (US); Nuwan Jayasena, Santa Clara, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 235 days.

(21) Appl. No.: 17/556,431

(22) Filed: Dec. 20, 2021

(65) Prior Publication Data
US 2023/0195645 A1  Jun. 22, 2023

(51) Int. Cl.
| | |
|---|---|
| *G06F 12/10* | (2016.01) |
| *G06F 12/02* | (2006.01) |
| *G06F 12/1009* | (2016.01) |
| *G06F 12/1045* | (2016.01) |
| *G06F 12/1072* | (2016.01) |
| *G06F 13/16* | (2006.01) |

(52) U.S. Cl.
CPC ...... *G06F 12/1072* (2013.01); *G06F 12/0238* (2013.01); *G06F 12/1009* (2013.01); *G06F 12/1054* (2013.01); *G06F 12/1063* (2013.01); *G06F 13/1673* (2013.01); *G06F 2212/7201* (2013.01)

(58) Field of Classification Search
CPC .. G06F 12/10; G06F 12/1009; G06F 12/1072; G06F 12/109; G06F 12/1036; G06F 12/145; G06F 9/48
See application file for complete search history.

(56) References Cited

U.S. PATENT DOCUMENTS

| | | |
|---|---|---|
| 6,233,668 B1 | 5/2001 | Harvey et al. |
| 6,725,456 B1 | 4/2004 | Bruno et al. |

(Continued)

OTHER PUBLICATIONS

SpaceJMP Programming with Multiple VA Spaces by Hajj 2016 (Year: 2016).*

(Continued)

*Primary Examiner* — Paul M Knight (57) ABSTRACT

Process isolation for a PIM device includes: receiving, from a process, a call to allocate a virtual address space where the process stores a PIM configuration context; allocating the virtual address space including mapping a physical address space including PIM device configuration registers to the virtual address space only if the physical address space is not mapped to another process's virtual address space; and programming the PIM device configuration space according to the configuration context. When a PIM command is executed, a translation mechanism determines whether there is a valid mapping of a virtual address of the PIM command to a physical address of a PIM resource, such as a LIS entry. If a valid mapping exists, the translation is completed and the resource is accessed, but if there is not a valid mapping, the translation fails and the process is blocked from accessing the PIM resource.

19 Claims, 5 Drawing Sheets

(56) References Cited

U.S. PATENT DOCUMENTS

| | | | |
|---|---|---|---|
| 6,851,059 B1 | 2/2005 | Pfister et al. | |
| 8,738,860 B1* | 5/2014 | Griffin | G06F 12/0897 |
| | | | 711/122 |
| 2010/0023941 A1* | 1/2010 | Iwamatsu | G06F 9/45558 |
| | | | 718/1 |
| 2014/0237261 A1* | 8/2014 | Diep | G06F 12/1408 |
| | | | 713/189 |
| 2017/0048358 A1 | 2/2017 | Roberts et al. | |
| 2018/0089081 A1 | 3/2018 | Ramalingam | |
| 2019/0018777 A1 | 1/2019 | Swaine | |
| 2019/0066761 A1 | 2/2019 | Lea et al. | |
| 2019/0079677 A1 | 3/2019 | Malladi et al. | |
| 2023/0195459 A1* | 6/2023 | Puthoor | G06F 9/30043 |
| | | | 712/225 |

OTHER PUBLICATIONS

Memory Management in PIM Based Archetecture by Hall 2000 (Year: 2000).*

Process in Process Techniques for Practical Address Space by Hori 2018 (Year: 2018).*

Gao, et al., "Practical Near-Data Processing for In-memory Analytics Frameworks," 2015 International Conference on Parallel Architecture and Compilation (PACT), Oct. 2015, IEEE, San Francisco, CA, 12 pages.

Kim et al., "Silent-PIM: Realizing the Processing-in-Memory Computing With Standard Memory Requests," IEEE Transactions on Parallel and Distributed Systems, vol. 33, No. 2, Feb. 2022, Date of Publication: Mar. 11, 2021, DOI: 10.1109/TPDS.2021.3065365, pp. 251-262.

* cited by examiner

VIRTUAL PARTITIONING A PROCESSOR-IN-MEMORY ("PIM")

BACKGROUND

Computing systems often include a number of processing resources, such as processors or processor cores, which can retrieve instructions, execute instructions, and store the results of executed instructions to memory. A processing resource can include a number of functional units such as arithmetic logic units (ALUs), floating point units (FPUs), and combinatorial logic blocks, among others. Typically, such functional units are local to the processing resources. That is, functional units tend to be implemented as part of a processor and are separate from memory devices in which data to be operated upon is retrieved and data forming the results of operations is stored. Such data can be accessed via a bus between the processing resources and memory.

Processing performance can be improved by offloading operations that would normally be executed in the functional units to a processing-in-memory (PIM) device. PIM refers to an integration of compute and memory for execution of instructions that would otherwise be executed by a computer system's primary processor or processor cores. In some implementations, PIM devices incorporate both memory and functional units in a single component or chip. Although PIM is often implemented as processing that is incorporated 'in' memory, this specification does not limit PIM so. Instead, PIM may also include so-called processing-near-memory implementations and other accelerator architectures. That is, the term 'PIM' as used in this specification refers to any integration—whether in a single chip or separate chips—of compute and memory for execution of instructions that would otherwise be executed by a computer system's primary processor or processor core. In this way, instructions executed in a PIM architecture are executed 'closer' to the memory accessed in executing the instruction. A PIM device can therefore save time by reducing or eliminating external communications and can also conserve power that would otherwise be necessary to process memory communications between the processor and the memory.

DETAILED DESCRIPTION

As mentioned above, PIM architectures support operations to be performed in, at, or near to the memory module storing the data on which the operations are performed on or with. Such an architectures allows for improved computational efficiency through reduced data transfer as well as reduced power consumption. In some implementations, a PIM architecture supports offloading instructions from a host processor for execution in memory or near memory, such that bandwidth on the data link between the processor and the memory is conserved and power consumption of the processor is reduced. The execution of PIM instructions by a PIM device does not require loading data into local CPU/GPU registers and writing data from local CPU/GPU storage back to the memory. In fact, any processing element that is coupled to memory for execution of operations can benefit from PIM device execution.

Such host processor often supports multi-processing where multiple processes of the same or different applications are executed in parallel. In such a multi-processing environment, however, without protection, two or more processes can simultaneously access a shared PIM resource in a manner that results in functional incorrectness or security vulnerability. Concurrent access can result in functional incorrectness when, for example, two processes access the same PIM register. For example, assume process "A" loaded instructions into a PIM's local instruction store. During process A's PIM execution, suppose another process such as, for example, process "B" modifies this local instruction store. Process A's PIM code is then corrupted, and process A's PIM execution will return incorrect results. Similarly, process B can also access PIM registers by sending PIM memory operations and can corrupt the PIM register state as well, resulting in incorrect PIM phase execution of process A.

Additionally, such simultaneous access can also result in security vulnerabilities. For example, one process can create a side channel via PIM registers to another process's data without knowledge of that process. For example, if process B is malicious, process B can create a side channel via PIM registers by sending PIM memory operations that can leak PIM register information of process A into its own address space.

Accordingly, implementations in accordance with the present disclosure provide software and hardware support and resource management techniques for providing controlling access to a PIM device through the use of virtualization. For explanation, in the description below, a "PIM offload instruction" is executed by a processor core, a "PIM command" is generated and issued to a PIM device as a result of executing the PIM offload instruction, and a "PIM instruction" is executed by the PIM device. Implementations in accordance with the present disclosure prevent corruption of PIM configuration space, including a local instruction store (LIS) that stores PIM instructions for execution, PIM configuration registers, and the like. PIM orchestration operations are isolated by allowing and restricting only one process to orchestrate a PIM device or set of PIM devices resources at a time. It should also be noted that PIM memory/units has two distinct spaces; 1) a PIM configuration space used for configuring the PIM before the PIM operation, and 2) a PIM orchestration space, which is used to orchestrate execution of PIM operations. That is, the LIS component stores the PIM instructions that will be executed on the PIM device.

In one aspect, a PIM device can also be a PIM unit and "device," or "unit" can be used interchangeably. In one aspect, as used herein "orchestrate" refers to the planning, coordinating, configuration and managing each operation related to a PIM. While examples in this disclosure discuss the applicability of the implementations to PIM technology, such examples should not be construed as limiting. Readers of skill in the art will appreciate that implementations disclosed here are applicable virtual partitioning and orchestration on a processor-in-memory ("PIM") is disclosed.

To that end, various apparatus, agents, and methods are disclosed in this specification for process isolation for a PIM device using virtualization. An implementation is directed to an apparatus configured for such process isolation. The apparatus includes one or more processing cores and computer memory. The computer memory comprises computer program instructions that, when executed, cause the apparatus to carry out: receiving, from a process, a call to allocate a virtual address space, where the process stores a PIM configuration context in the virtual address space; allocating the virtual address space to the process including mapping a physical address space including configuration registers of the PIM device to the virtual address space only if the physical address space is not mapped to another process's virtual address space; and programming the PIM device configuration space according to the configuration context.

In an implementation, the configuration context includes a virtual instruction store comprising a plurality of entries, with each entry including a PIM instruction opcode and the virtual instruction store is mapped to a local instruction store utilized by the PIM device. In such an implementation, the apparatus also includes computer program instructions that, when executed, cause the apparatus to carry out: responsive to receiving a PIM command that includes a virtual address indexing an entry in the virtual instruction store, translating the virtual address to a physical address indexing an entry of the local instruction store; and retrieving, from the entry of the local instruction store, the PIM instruction opcode.

In an implementation, the apparatus includes a translation mechanism that determines whether there is a valid mapping of the virtual address and translates the virtual address only if a valid mapping exists. In another implementation, the apparatus also includes a PIM agent that includes the translation mechanism.

In an implementation of the apparatus, allocating the virtual address space to the process includes mapping memory buffers on which PIM commands operate to one or more memory pages assigned to the process. In such an implementation, the apparatus includes computer program instructions that, when executed, cause the apparatus to carry out: receiving, from the process, a PIM command targeting a virtual memory address of a memory buffer; and translating the virtual memory address to a physical address of one of the memory buffers only if the physical address is included in one of the memory pages assigned to the process.

In an implementation, the apparatus of also includes computer program instructions that, when executed, cause the apparatus to carry out, while the virtual address space is allocated to the process: receiving, from a second process, a call to allocate a second virtual address space, where the second process stores a second PIM configuration context in the second virtual address space; allocating the second virtual address space to the second process, including mapping a different physical address space that includes different PIM device configuration registers to the second virtual address space only if the different physical address space is not mapped to another process's virtual address space; and programming the different PIM device configuration registers according to the second configuration context. In such an implementation, allocating the second virtual address space to the second process includes mapping different memory buffers on which PIM instructions operate to one or more different memory pages assigned to the second process. Additionally, the apparatus includes computer program instructions that, when executed, cause the apparatus to carry out: receiving, from the second process, a second PIM command targeting a second virtual memory address of a different memory buffer; and translating the second virtual memory address to a physical address of one of the different memory buffers only if the physical address is included in one of the memory pages assigned to the second process.

In an implementation, the computer program instructions can be a driver, an operating system, or a hypervisor. In some implementations, the PIM device is a component of the apparatus. In other implementations, the PIM device is a component that is separate from the apparatus.

A method of process isolation for a PIM device using virtualization is disclosed in this specification. In an implementation, the method includes receiving, from a process, a call to allocate a virtual address space. The process stores a PIM configuration context in the virtual address space. The method also includes allocating the virtual address space to the process including mapping a physical address space that comprises configuration registers of the PIM device to the virtual address space. Such a mapping is carried out only if the physical address space is not mapped to another process's virtual address space/The method also includes programming the PIM device configuration space according to the configuration context.

In an implementation, the configuration context includes a virtual instruction store comprising a plurality of entries, with each entry including a PIM instruction opcode and the virtual instruction store is mapped to a local instruction store utilized by the PIM device. In such an implementation, the method also includes: responsive to receiving a PIM instruction that includes a virtual address indexing an entry in the virtual instruction store, translating the virtual address to a physical address indexing an entry of the local instruction store; and retrieving, from the entry of the local instruction store, the opcode of the PIM instruction.

In an implementation of the method, allocating the virtual address space to the process includes mapping memory buffers on which PIM instructions operate to one or more memory pages assigned to the process, and the method also includes: receiving, from the process, a PIM instruction targeting a virtual memory address of a memory buffer; and translating the virtual memory address to a physical address of one of the memory buffers only if the physical address is included in one of the memory pages assigned to the process.

In an implementation, while the virtual address space is allocated to the process, the method includes receiving, from a second process, a call to allocate a second virtual address space, where the second process stores a second PIM configuration context in the second virtual address space; allocating the second virtual address space to the second process, including mapping a different physical address space that comprises different PIM device configuration registers to the second virtual address space only if the different physical address space is not mapped to another process's virtual address space; and programming the different PIM device configuration registers according to the second configuration context. In such an implementation, allocating the second virtual address space to the second process includes mapping different memory buffers on which PIM instructions operate to one or more different memory pages assigned to the second process, and the method includes: receiving, from the second process, a second PIM instruction targeting a second virtual memory address of a different memory buffer; and translating the second virtual memory address to a physical address of one of the different memory buffers only if the physical address is included in one of the memory pages assigned to the second process.

Figure 1:
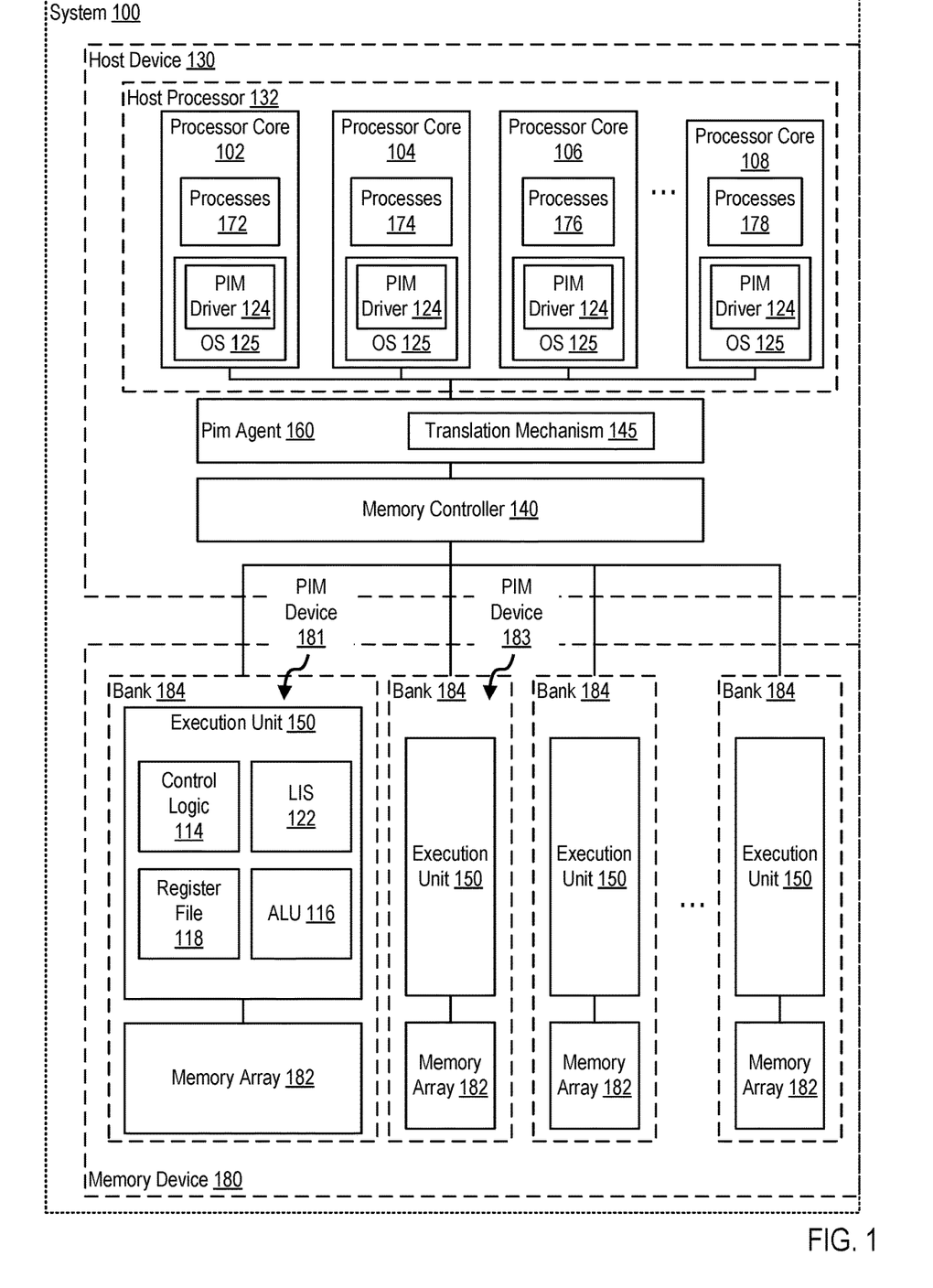
FIG. 1 sets forth a block diagram of an example system for process isolation for a PIM device in accordance with the present disclosure.

Implementations in accordance with the present disclosure will be described in further detail beginning with FIG. 1. Like reference numerals refer to like elements throughout the specification and drawings. FIG. 1 sets forth a block diagram of an example system 100 for process isolation for a PIM device in accordance with the present disclosure.

The example system 100 of FIG. 1 includes a host device 130 including a processor 132 that includes one or more processor cores 102, 104, 106, 108. While four processor cores are depicted in FIG. 1, it should be understood that the host device 130 can include more or fewer processor cores than depicted. In various examples, the processor cores 102, 104, 106, 108 are CPU cores, GPU cores, or APU cores of the host device 130. In various examples, the processor cores 102, 104, 106, 108 operate as PIM control engines.

The GPU is a graphics and video rendering device for computers, workstations, game consoles, and similar digital processing devices. A GPU is generally implemented as a co-processor component to the CPU of a computer. The GPU can be discrete or integrated. For example, the GPU can be provided in the form of an add-in card (e.g., video card), stand-alone co-processor, or as functionality that is integrated directly into the motherboard of the computer or into other devices.

The phrase accelerated processing unit ("APU") is considered to be a broad expression. The term 'APU' refers to any cooperating collection of hardware and/or software that performs those functions and computations associated with accelerating graphics processing tasks, data parallel tasks, nested data parallel tasks in an accelerated manner compared to conventional CPUs, conventional GPUs, software and/or combinations thereof. For example, an APU is a processing unit (e.g., processing chip/device) that can function both as a central processing unit ("CPU") and a graphics processing unit ("GPU"). An APU can be a chip that includes additional processing capabilities used to accelerate one or more types of computations outside of a general-purpose CPU. In one implementation, an APU can include a general-purpose CPU integrated on a same die with a GPU, a FPGA, machine learning processors, digital signal processors (DSPs), and audio/sound processors, or other processing unit, thus improving data transfer rates between these units while reducing power consumption. In some implementations, an APU can include video processing and other application-specific accelerators.

It should be noted that the terms processing in memory (PIM), processing near-memory (PNM), or processing in or near-memory (PINM), all refer a device (or unit) which includes a non-transitory computer readable memory device, such as dynamic random access memory (DRAM), and one or more processing elements. The memory and processing elements can be located on the same chip, within the same package, or can otherwise be tightly coupled. For example, a PNM device could include a stacked memory having several memory layers stacked on a base die, where the base die includes a processing device that provides near-memory processing capabilities.

The host device 130 of FIG. 1 is configured to host multi-process execution. For example, each processor core 102, 104, 106, 108 of the host device 130 executes a different process 172, 174, 176, 178 of the same or different application.

In an implementation, the processor cores 102, 104, 106, 108 operate according to an extended instruction set architecture (ISA) that includes explicit support for PIM offload instructions that are offloaded to a PIM device for execution. Examples of PIM offload instruction include a PIM_Load and PIM_Store instruction among others. In another implementation, the processor cores operate according to an ISA that does not expressly include support for PIM offload instructions. In such an implementation, a PIM driver, hypervisor, or operating system provides an ability for a process to allocate a virtual memory address range that is utilized exclusively for PIM offload instructions. An instruction referencing a location within the aperture will be identified as a PIM offload instruction.

In the implementation in which the processor cores operate according to an extended ISA that explicitly supports PIM instructions, a PIM instruction is completed by the processor cores 102, 104, 106, 108 when virtual and physical memory addresses associated with the PIM instruction are generated, operand values in processor registers become available, and memory consistency checks have completed. The operation (e.g., load, store, add, multiply) indicated in the PIM instruction is not executed on the processor core and is instead offloaded for execution on the PIM device. Once the PIM offload instruction is complete in the processor core, the processor core issues a PIM command, operand values, memory addresses, and other metadata to the PIM device. In this way, the workload on the processor cores 102, 104, 106, 108 is alleviated by offloading an operation for execution on a device external to or remote from the processor cores 102, 104, 106, 108.

The memory addresses of the PIM command refer to, among other things, an entry in a local instruction store that stores a PIM instruction that is to be executed by at least one PIM device 181. In the example of FIG. 1, the PIM device 181 is an execution unit 150 that is external to the processor 132 and processor cores 102, 104, 106, 108. In one example, the execution unit includes control logic 114 for decoding instructions or commands issued from the processor cores 102, 104, 106, 108, an arithmetic logic unit (ALU) 116 that performs an operation indicated in the PIM instructions or command, and a register file 118 including a plurality of indexed registers for holding data for load/store operations to memory or intermediate values of ALU computations. In some examples, the ALU 116 is capable performing a limited set of operations relative to the ALUs of the processor cores 102, 104, 106, 108, thus making the ALU 116 less complex to implement and, for example, more suited for an in-memory implementation.

A PIM instruction can move data between the registers and memory, and it can also trigger computation on this data in the ALU 116. In some examples, the execution unit also includes a local instruction store (LIS) 122 that stores commands of PIM instructions written into the LIS by the host processor 132. In these examples, the PIM instructions include a pointer to an index in the LIS 122 that includes the operations to be executed in response to receiving the PIM instruction. For example, the LIS 122 holds the actual opcodes and operands of each PIM instruction.

The execution unit 150 is a PIM device 181 that is included in a PIM-enabled memory device 180 (e.g., a remote memory device) having one or more DRAM arrays. In such an implementation, PIM instructions direct the PIM device 181 to execute an operation on data stored in the PIM-enabled memory device 180. For example, operators of PIM instructions include load, store, and arithmetic operators, and operands of PIM instructions can include architected PIM registers, memory addresses, and values from core registers or other core-computed values. The ISA can define the set of architected PIM registers (e.g., eight indexed registers).

In some examples, there is one execution unit per DRAM component (e.g., bank, channel, chip, rank, module, die, etc.), thus the PIM-enabled memory device 180 include multiple execution units 150 that are PIM devices. PIM commands issued from the processor cores 102, 104, 106, 108 can access data from DRAM by opening/closing rows and reading/writing columns (like conventional DRAM commands do). In some implementations, the host processor 132 issues PIM commands to the ALU 116 of each execution unit 150. In implementations with a LIS 122, the host processor 132 issues commands that include an index into a line of the LIS holding the PIM instruction to be executed by the ALU 116. In these implementations with a LIS 122, the host-memory interface does not require modification with additional command pins to cover all the possible opcodes needed for PIM. Each PIM command carries a target address that is used to direct it to the appropriate PIM unit(s) as well as the PIM instruction to be performed. An execution unit 150 can operate on a distinct subset of the physical address space. When a PIM command reaches the execution unit 150, it is serialized with other PIM commands and memory accesses to DRAM targeting the same subset of the physical address space.

The execution unit 150 is characterized by faster access to data relative to the host processor 132. The execution unit 150 operates at the direction of the processor cores 102, 104, 106, 108 to execute memory intensive tasks. In the example of FIG. 1, the execution unit 150 is implemented within a memory partition and is coupled to a memory array 182. The memory array 182 can be one or more arrays of memory cells of a bank, channel, or other memory hierarchy partition. Without loss of generality, when discussing execution units 150 as PIM devices, it is assumed that each execution unit is coupled to a respective memory bank 184 that includes the memory array 182. Readers of skill in the art will appreciate that various configurations of PIM devices and memory partitions (physical or logical) in a PIM-enabled memory device can be employed without departing from the spirit of the present disclosure. The PIM-enabled memory devices can be memory devices such a double data rate (DDRx) memory device, graphics DDRx (GDDRx) memory device, low power DDRx (LPDDRx) memory device, high bandwidth memory (HBM) device, hybrid memory cube (HMC) device, Non-Volatile Random-Access Memory (NV-RAM) device, or other memory device that supports PIM.

The host device 130 also includes at least one memory controller 140 that is shared by the processor cores 102, 104, 106, 108 for accessing a channel of the PIM-enabled memory device 180. In some implementations, the host device 130 can include multiple memory controllers, each corresponding to a different memory channel in the PIM-enabled memory device 180. In some examples, the memory controller 140 is also used by the processor cores 102, 104, 106, 108 for executing one or more processes 172, 174, 176, and 178 and offloading PIM instructions for execution by the execution unit 150.

The memory controller 140 maintains one or more dispatch queues for queuing commands to be dispatched to a memory channel or other memory partition. Stored in memory and executed by the processor cores 102, 104, 106, 108 is an operating system 125 and a PIM driver 124.

Stored in the memory array 182 is an operating system 125 and a PIIM driver 124. The OS 125 and PIM driver are executed by any of the processor cores of the host processor 132. In an implementation, the PIM Driver 124 provides virtualization of PIM configuration and orchestration resources in order to provide isolation between executing processes 172, 174, 176, 178 according to embodiments of the present disclosure.

In the example of FIG. 1, a process 172, makes a call to the PIM driver 124 to allocate a virtual address space specifically for storing PIM configuration context. The PIM driver 124 receives the call and allocates the virtual address space to the process 172. The PIM driver 124 then determines whether a physical address space of the configuration registers of the PIM device 181 is mapped to another process's virtual address space. Such a mapping of the PIM configuration register physical address space to another process's virtual address indicates that the other process is currently utilizing the PIM device or is 'active' on the PIM device. If there is another active process, the PIM driver does not map the requesting process's 172 virtual address to the physical address of the configuration registers of the PIM device 181. If there is not another active process, the PIM driver 124 maps the physical address space of the configuration registers of the PIM device to the virtual address space of the requesting device 172. Additionally, the PIM driver utilizes the context stored in the virtual address space of the requesting process 172 to program the PIM device configuration space. In this way, the PIM driver virtualizes the configuration space of the PIM device and ensures that only a single process can program that configuration space at a time.

The configuration context stored by the process 172 in virtual memory and then later programmed into the configuration space of the PIM device 181 includes a virtual instruction store. The virtual instruction store includes a set of entries, with each entry storing a PIM instruction opcode. The virtual instruction store is mapped to the LIS that is utilized by the PIM device. Readers should note that the LIS 122 is said to be 'utilized' by the PIM device because in some implementations the LIS is implemented as part of the PIM device while in other implementations the LIS is implemented as a component separate from, but near to the PIM device. The PIM driver 124 programs a translation mechanism (such as a TLB or page table entry) with the mappings of virtual instruction store entries to physical LIS entries. When a PIM command that includes a virtual address indexing an entry in the virtual instruction store is executed, the translation mechanism determines whether a mapping is valid and, if so, performs the translation of the virtual address to a physical address indexing an entry of the LIS 155. The opcode of the PIM instruction can then be retrieved from the entry in the LIS for execution by the PIM device 181. If there is no valid mapping—meaning virtual address included with the PIM command is not mapped to a physical address in the translation mechanism—the translation fails. In this way, isolation of the PIM resources is enforced by the translation mechanism. For example, if malicious process were to try to access a PIM instruction at a particular address, the translation mechanism will effectively enforce isolation because that malicious process will not have an address with a valid translation.

In an implementation, the PIM driver, when allocating the virtual memory address space to a requesting process 172, maps memory buffers on which PIM instructions operate to one or more memory pages assigned to the process. The PIM driver 124 then receives, from the process 172, a PIM instruction targeting a virtual memory address of the memory buffer and translates the virtual memory address to a physical address of one of the memory buffers only if the physical address is included in one of the memory pages assigned to the process. That is, operands of PIM instructions are referenced by a process through a virtual memory address and the if the virtual memory address is mapped to a physical memory page that is assigned to the process, the translation of the virtual memory address to physical address can be carried out. If the process is not assigned to the physical memory page, the translation is not carried out and the process cannot access the physical memory buffer of the PIM device that stores the operand upon which the process's PIM instruction is attempting to operate. In this way, one process cannot access data that is to be used by another process's PIM instruction. This, in turn, removes the risk of functional incorrectness through multiprocess conflicts.

Readers will recognize that while a PIM driver 124 is described here as carrying out the virtualization of the PIM resources to ensure process isolation, other components and modules can perform such virtualization. Any one or combination of the PIM driver 124, operating system 125, a hypervisor (not shown here) can perform such virtualization. Enforcing the virtualization is generally carried out by a translation mechanism in the processor cores or host processor, or a standalone component in the form of a PIM agent.

In an implementation, the apparatus of FIG. 1 includes a number of different PIM devices (each implemented in a separate bank 184). Similarly in some implementations, a single PIM device can be logically partitioned into multiple sets of configuration and orchestration spaces that can be independently accessed by different processes. Consider, as an example, that process 172 has allocated a virtual address space for a configuration context of the PIM device 181 and the PIM driver has mapped that configuration address space to the process 172 and assigned physical pages for receiving operands of PIM instructions to the process 172. Consider also that process 174, while the virtual address space is allocated to the process 172, makes a call to allocate a second virtual address space that stores a second PIM configuration context of the process 174. The PIM driver, having another available PIM device 183 allocates the second virtual address space to the second process and maps the physical address space of the second PIM device 183 to the second virtual address space only if the configuration and orchestration space of the second PIM device 183 is not mapped to another process's virtual address space. The driver 124 can then program the second PIM device's 183 configuration registers according to the second configuration context of the process 174. In this way, multiple processes can concurrently access different PIM drivers or PIM driver partitions while maintaining process isolation.

In some implementations, a PIM agent 160 is responsible for PIM configuration and/or orchestration of the execution unit 150. The PIM agent 160 can be the processor cores 102, 104, 106, 108. In some implementations, the PIM agent 160 can be a dedicated processing element such as, for example, a platform security processor or direct memory controller ("DMA") microcontroller, or any other system agent of the system 100. By way of illustration only, FIG. 1 depicts the PIM agent 160 as a stand-alone, dedicated processing element in communication with the processor cores 102, 104, 106, 108 and the memory controllers 140.

The application or software code on the PIM agent 160 runs in the user address space. The user application will make an API call provided by the PIM runtime or PIM library for configuring and orchestrating PIM. A processor core 102, 104, 106, 108 (or driver) can also offload the PIM configuration work to the PIM agent 160 and the PIM agent 160 runs in the driver's address space). Multiple users can launch orchestration work on the PIM and consequently PIM agent 160 receives multiple orchestration command. The PIM agent 160 concurrently launches work from different users. The virtualized LIS 155 will provide the necessary isolation.

In some implementations, the PIM agent 160 manages PIM resources at the host level before reaching any DRAM channels of the PIM-enabled memory device 180 that host PIM unit to which the thread can dispatch work. That is, the PIM agent 160, using a translation mechanism 145 and the LIS component 155, determines whether a process has a valid virtual-to-physical mapping with the execution unit 150. If there is a valid virtual-to-physical mapping, the translation mechanism 145 provides the physical address of the translation and the PIM agent issues a PIM command to the execution unit 150 with the physical address. If there is not a valid virtual-to-physical mapping, the translation mechanism faults and the process cannot access the PIM resources of the PIM device 181.

Figure 2:
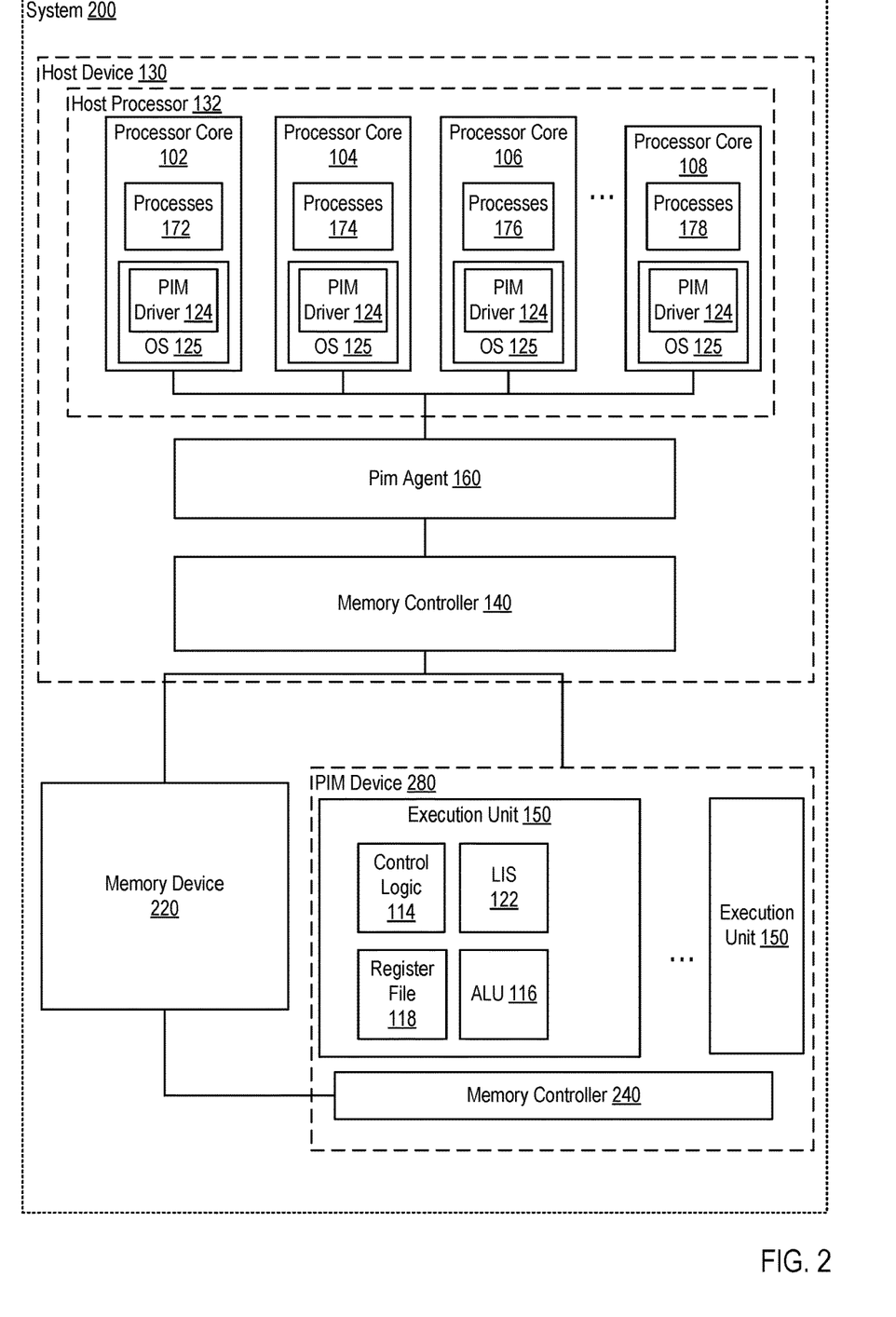
FIG. 2 sets forth a block diagram of an example system for supporting multiprocessing with PIM in accordance with the present disclosure.

FIG. 2 sets forth a block diagram of an example system 200 for supporting multiprocessing with PIM in accordance with the present disclosure. The example system 200 of FIG. 2 includes many of the same components of system 100 of FIG. 1.

In the example of FIG. 2, the execution unit 150 is a component of a PIM device 280 that is implemented in a processing-near-memory (PNM) fashion. For example, the PIM device 280 can be a memory accelerator that is used to execute memory-intensive operations that have been offloaded to by the host processor 132 to the accelerator. The host processor 132 and the PIM device 280 are both coupled to the same memory 220. The host processor 132 provides PIM instructions to the PIM device 280 through the memory controller 140, which the execution unit 150 of the PIM device 280 performs on data stored in the memory 220. Thus, the PIM device 280 is "near" memory in that the execution unit 150 is interposed between the memory controller 140 of the host processor 132 and the memory 220. In some examples, the PIM device 280 is coupled to the memory 220 via a memory controller 240, where the memory 220 is not specifically a PIM-enabled memory. In the example of FIG. 2, the execution unit 150 is not implemented within a particular DRAM component (e.g., bank, channel, chip, rank, module, die, etc.) but is closely coupled to the memory 220. For example, the PIM device 280 can be implemented in the interface die of a 3-D stacked memory device or as a separate die.

Figure 3A:
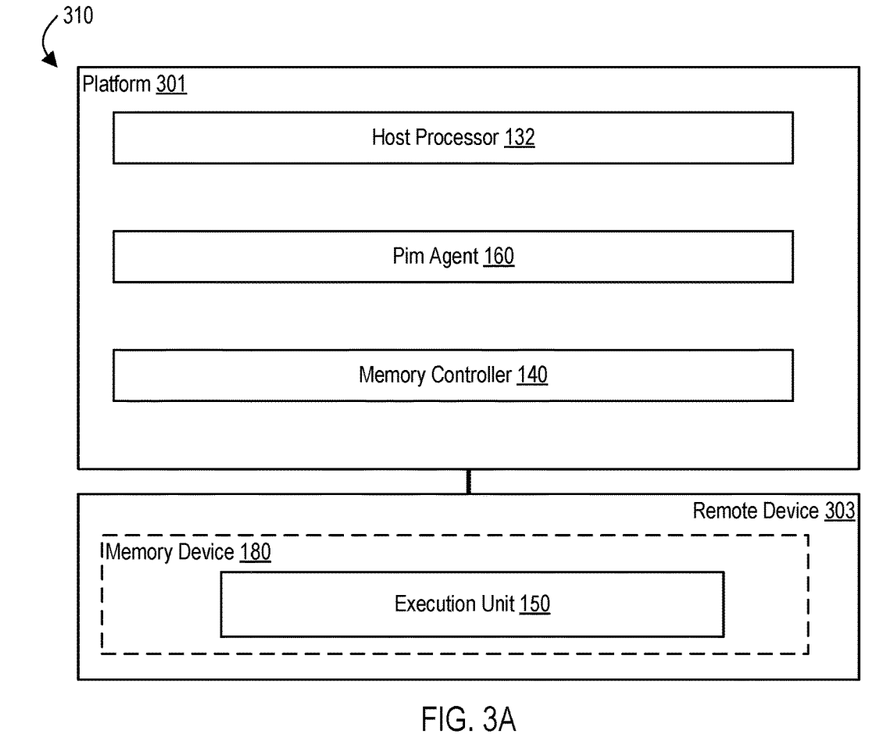
FIG. 3A sets forth a block diagram of an exemplary system configuration for supporting process isolation for a PIM device according to some implementations of the present disclosure.

FIG. 3A sets forth a block diagram of an exemplary system configuration 310 for supporting process isolation for a PIM device according to some implementations of the present disclosure. In the example configuration 310 of FIG. 3A, the memory controller 140, the PIM agent 160, and the host processor 132 and are implemented in the same System-on-Chip (SoC) platform 301. An execution unit 150 is implemented in a remote device 303. In some examples, the execution unit 150 is a component of a remote memory device 180 (e.g., a PIM-enabled memory device) that is implemented in the same package as the SoC platform 301.

Figure 3B:
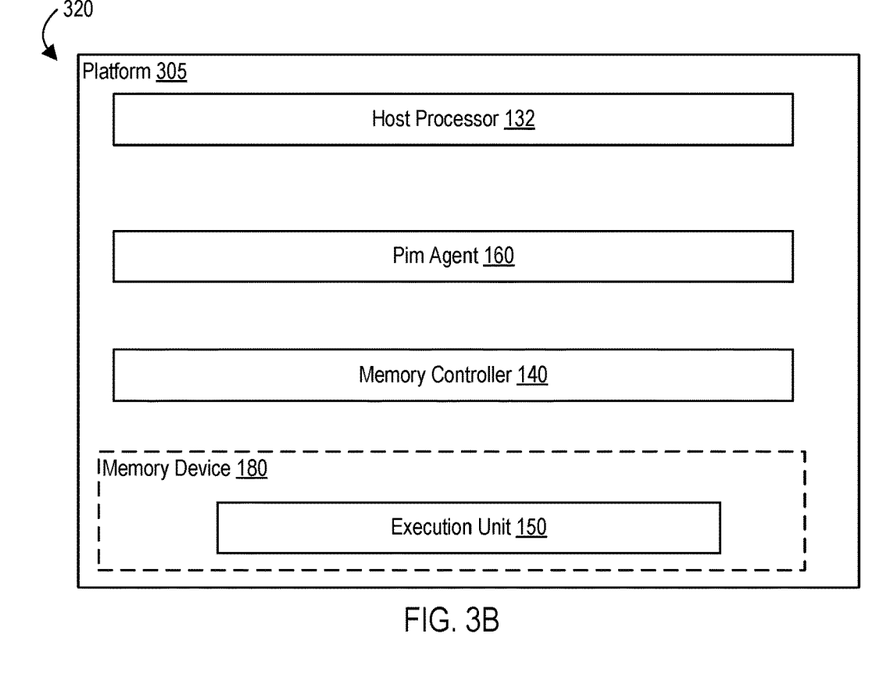
FIG. 3B sets forth another block diagram of an exemplary system configuration for supporting process isolation for a PIM device according to some implementations of the present disclosure.

FIG. 3B sets forth another block diagram of an exemplary system configuration 310 for supporting process isolation for a PIM device according to some implementations of the present disclosure. In the example configuration 320 of FIG. 3B, the execution unit 150, the memory controller 140, the PIM agent 160, and the host processor 132 are implemented on the same SoC platform 305. In some examples, the execution unit 150 is a PIM unit of memory device 180 (e.g., a PIM-enabled memory device) that is also implemented on the same SoC platform 305. Although the execution unit 150 is implemented on the same SoC platform 305 as the host processor 132, it is noted that the execution unit 150 is considered to be external to the host processor 132 in that logic circuitry that implements the execution unit 150 is external to logic circuitry that implements any processor core of the host processor 132.

Figure 4:
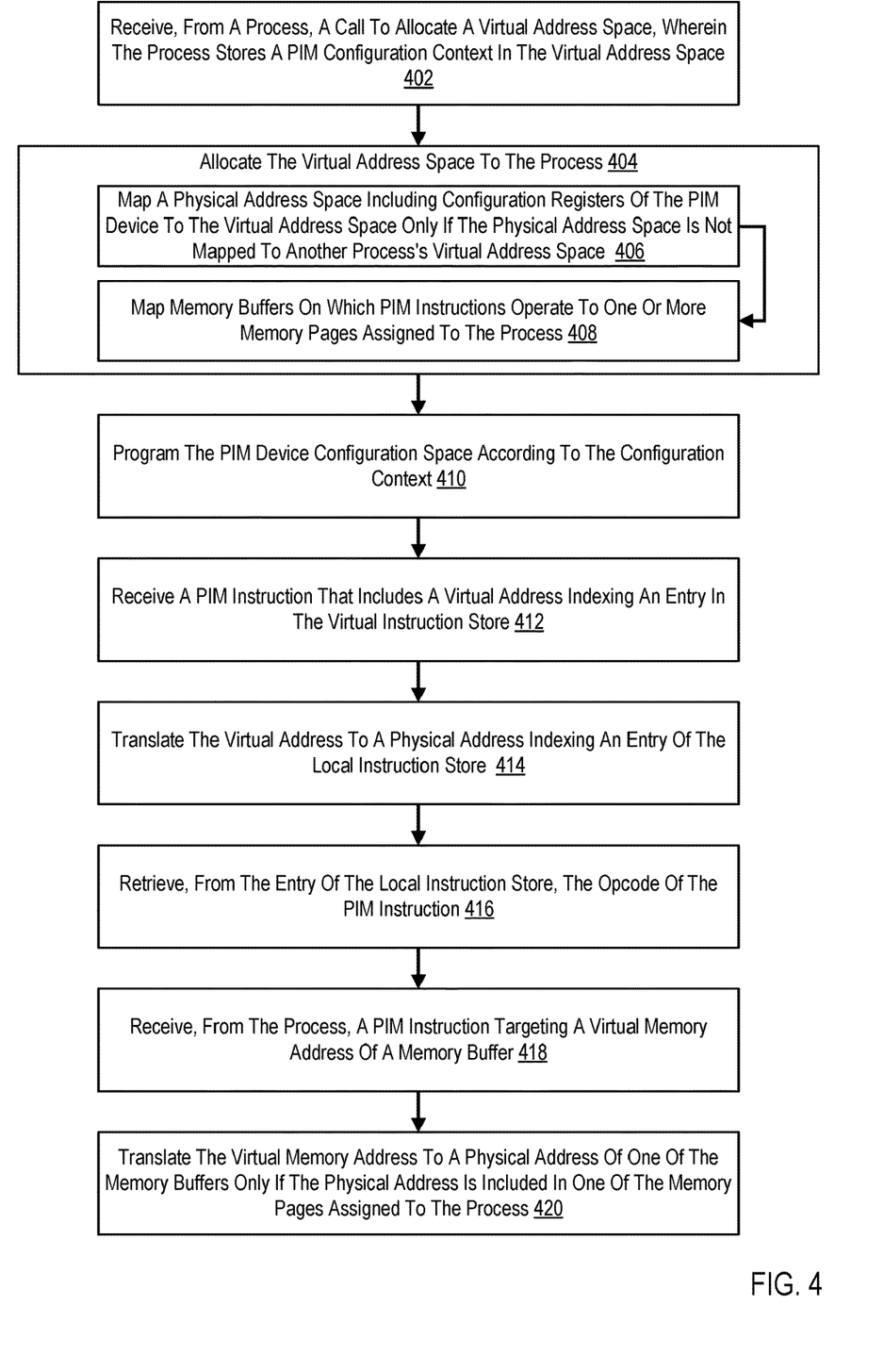
FIG. 4 sets forth a flow chart illustrating an example method of process isolation for a PIM device using virtualization according to implementations of the present disclosure.

FIG. 4 sets forth a flow chart illustrating an example of process isolation for a PIM device using virtualization according to implementations of the present disclosure. The flow chart of FIG. 4 includes receiving 402, from a process, a call to allocate a virtual address space. The process stores a PIM configuration context in the virtual address space. Depending upon the implementation, the call can be received by any of a PIM driver, an operating system, or a hypervisor.

In the flow chart of FIG. 4, the configuration context includes a virtual instruction store with a number of entries. Each of the entries includes a PIM instruction opcode. A 'virtual instruction store' is a virtualization of a local instruction store of a PIM device. That is, the virtual instruction store is a data structure in virtual memory that can be mapped to a physical, local instruction store (LIS) utilized by the PIM device. Each entry of a virtual instruction store include a PIM instruction opcode to be used in executing PIM instructions offloaded to the PIM device.

The flow chart of FIG. 4 also includes allocating 404 the virtual address space to the process. Allocating 404 the virtual address includes mapping 406 a physical address space of configuration registers of the PIM device to the virtual address space only if the physical address space is not mapped to another process's virtual address space. If the physical address space of the physical configuration space of the PIM device is already mapped to another process's virtual address space, the physical configuration space is essentially 'owned' by the other process. In that instance, the received call fails.

If the physical address of the configuration space of the PIM device is not currently mapped to any other process, then the PIM driver can allocate 404 the virtual address space by mapping 408 memory buffers on which PIM instructions operate to one or more memory pages assigned to the process.

The flow chart of FIG. 4 also includes programming 410 the PIM device configuration space according to the configuration context. Programming 410 the PIM device configuration space is carried out by storing values of the configuration context into configuration registers, initializing status registers, and so on. For example, the LIS of the PIM device is programmed with the opcodes of the virtual instruction store of the configuration context of the process. Once the configuration space is programmed according to the process's configuration context, the PIM device is prepared for use in executing PIM instructions.

The flow chart of FIG. 4 continues by receiving 412 a PIM command that includes a virtual address indexing an entry in the virtual instruction store. A translation mechanism determines whether a valid mapping of the virtual address to a physical address exists. If such a valid mapping does not exist, the translation fails and the process from which the PIM instruction was received is effectively prohibited from accessing PIM resources. If there is a valid virtual-to-physical mapping, the translation mechanism translates 414 the virtual address to a physical address. The physical address is an index to an entry of the local instruction store utilized by the PIM device.

The PIM device then utilizes the translated address (the physical address) to retrieve 416, from the entry of the local instruction store, a PIM instruction opcode. The opcode specifies an operation to be performed by the PIM device.

The flow chart also includes receiving 418, from the process, a PIM command targeting a virtual memory address of a memory buffer of the PIM device and translating 420 the virtual memory address to a physical address of one of the memory buffers only if the physical address is included in one of the memory pages assigned to the process. The memory buffer stores the operand of the instruction. A translation mechanism translates 420 the virtual memory address to a physical address only if the requesting process has valid mappings. The translation mechanism inspects memory page attributes to determine whether the memory page holding the virtual memory address is assigned to the process ID of the requesting process. If it is, the translation can proceed. If the memory page is assigned to another process ID, then translation fails. In this way, one process cannot access PIM memory buffers 'owned' or utilized by another process.

Figure 5:
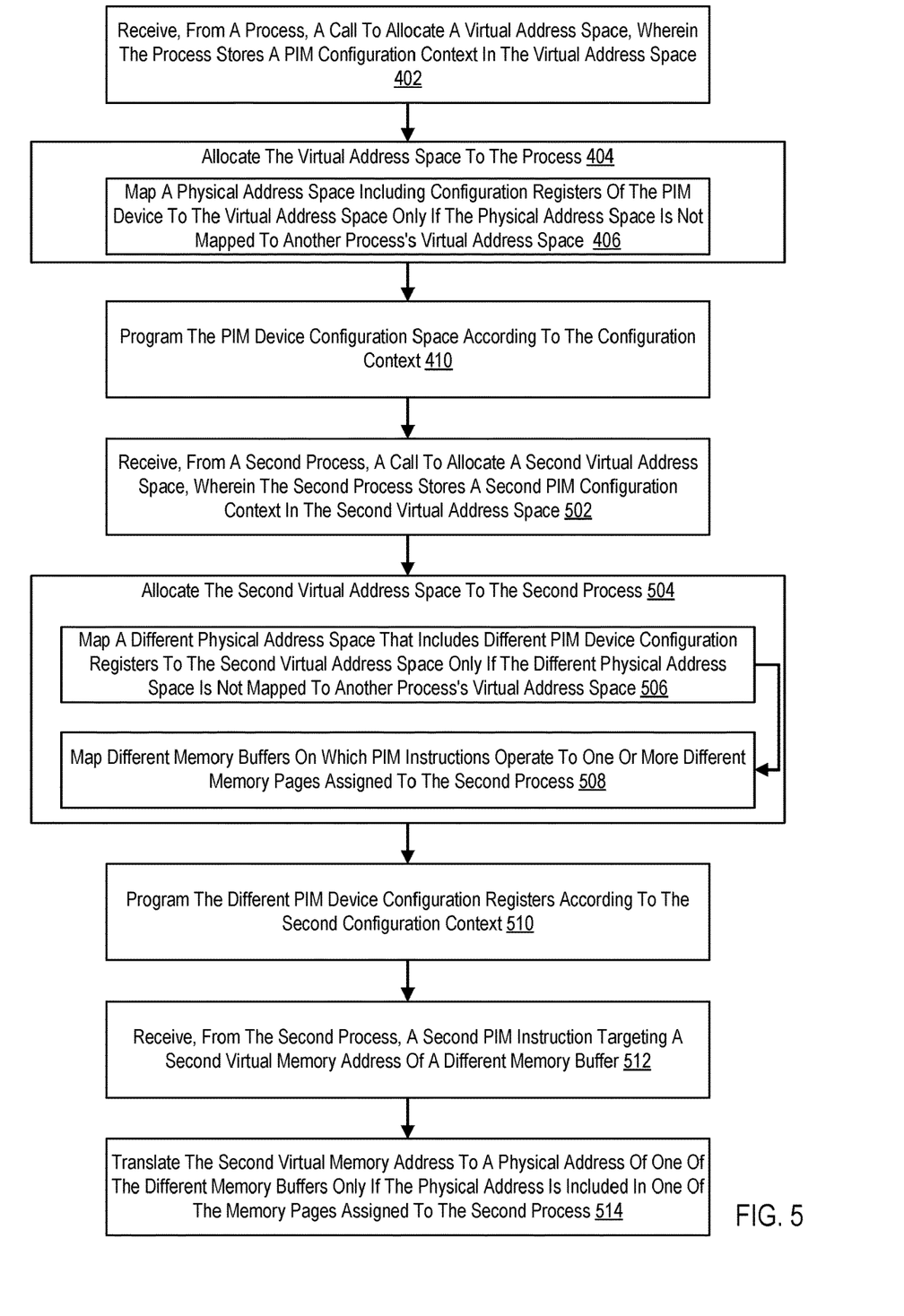
FIG. 5 sets forth a flow chart illustrating another method of process isolation for a PIM device using virtualization in which multiple different processes utilize different PIM resources simultaneously.

FIG. 5 sets forth a flow chart illustrating process isolation for a PIM device using virtualization in which multiple different processes utilize different PIM resources simultaneously. While the examples above generally describe assigning ownership of a PIM device to a single process, some PIM devices may include multiple logical or physical partitions that can be separately assigned to different processes and utilized by those process simultaneously without conflict or security concerns. Additionally, a system that includes multiple different PIM devices may assign out those resources to separate processes for parallel ownership.

The method of FIG. 5 includes many of the elements of FIG. 4 and further extends that method. While the virtual address space is allocated to the requesting process, the method of FIG. 5 includes receiving 502, from a second process, a call to allocate a second virtual address space. Like the first process, the second process also stores a second (its own) PIM configuration context in the second virtual address space.

The method of FIG. 5 continues by allocating 504 the second virtual address space to the second process. Here, the PIM driver (or other module mentioned above) allocates the virtual address space to the second process by mapping a different physical address space that includes different PIM device configuration registers to the second virtual address space. That is, one physical address space is mapped to the virtual address space of the first requesting process, while another physical address space is mapped to the virtual address space of the second requesting process. Such a mapping, however, is only carried out if the different physical address space is not mapped to another process's virtual address space. Again, much like the first requesting process, the PIM driver ensures that physical address space intended to be mapped to the second process's virtual address space is not already owned by another process. The PIM driver also programs 510 the different PIM device configuration registers according to the second configuration context.

The allocation 504 of the second virtual address space also includes mapping different memory buffers on which PIM instructions operate to one or more different memory pages assigned to the second process. The PIM driver then receives, from the second process, a second PIM instruction (different from the first PIM instruction of the first requesting process) targeting a second virtual memory address of a different memory buffer. The PIM driver translates the second virtual memory address to a physical address of one of the different memory buffers only if the physical address is included in one of the memory pages assigned to the second process.

In this way, the module providing process isolation blocks effectively assigns groups of PIM resources to different processes and ensures that no other process can utilize those resources when assigned. Security and functional correctness of the data is thus ensured.

Implementations can be a system, an apparatus, a method, and/or logic. Computer readable program instructions in the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some implementations, electronic circuitry including, for example, programmable logic circuitry, field-programmable gate arrays (FPGA), or programmable logic arrays (PLA) can execute the computer readable program instructions by utilizing state information of the computer readable program instructions.

Aspects of the present disclosure are described herein with reference to flowchart illustrations and/or block diagrams of methods, apparatus (systems), and logic circuitry according to some implementations of the disclosure. It will be understood that each block of the flowchart illustrations and/or block diagrams, and combinations of blocks in the flowchart illustrations and/or block diagrams, can be implemented by logic circuitry.

The logic circuitry can be implemented in a processor, other programmable data processing apparatus, or other device to cause a series of operational steps to be performed on the processor, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and logic circuitry according to various implementations of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

While the present disclosure has been particularly shown and described with reference to implementations thereof, it will be understood that various changes in form and details can be made therein without departing from the spirit and scope of the following claims. Therefore, the implementations described herein should be considered in a descriptive sense only and not for purposes of limitation. The present disclosure is defined not by the detailed description but by the appended claims, and all differences within the scope will be construed as being included in the present disclosure.

What is claimed is:

1. An apparatus comprising:
   one or more processing cores and computer memory, wherein the computer memory comprises computer program instructions that, when executed, cause the apparatus to:
   map a physical address space of a configuration space of a processing-in-memory (PIM) device to a virtual address space associated with a process only if the physical address space is not mapped to another process's virtual address space, wherein the virtual address space associated with the process includes a PIM configuration context; and
   program the configuration space of the PIM device with data of the PIM configuration context.

2. The apparatus of claim 1, wherein:
   the PIM configuration context includes a virtual instruction store comprising a plurality of entries, with each entry including a PIM instruction opcode;
   the virtual instruction store is mapped to a local instruction store utilized by the PIM device; and
   the computer memory further comprises computer program instructions that, when executed, cause the apparatus to:
   responsive to receiving a PIM command that includes a virtual address indexing an entry in the virtual instruction store, translate the virtual address to a physical address indexing an entry of the local instruction store; and
   retrieve, from the entry of the local instruction store, the PIM instruction opcode.

3. The apparatus of claim 2, wherein the computer memory further comprises computer program instructions that, when executed, cause the apparatus to translate the virtual address only if a valid mapping of the virtual address exists.

4. The apparatus of claim 1, wherein mapping the physical address space of the configuration space to the virtual address space comprises mapping memory buffers on which PIM instructions operate to one or more memory pages assigned to the process, and the computer memory further comprises computer program instructions that, when executed, cause the apparatus to:
   receive, from the process, a PIM command targeting a virtual memory address of a memory buffer; and
   translate the virtual memory address to a physical address of one of the memory buffers only if the physical address is included in one of the memory pages assigned to the process.

5. The apparatus of claim 1, wherein the computer memory further comprises computer program instructions that, when executed, cause the apparatus to:
- map, while the virtual address space is allocated to the process, a second physical address space of a second configuration space of a second PIM device to a second virtual address space associated with a second process only if the second physical address space is not mapped to another process's virtual address space, wherein the second virtual address space includes a second PIM configuration context; and
- program the second configuration space with data of the second PIM configuration context.

6. The apparatus of claim 5, wherein mapping the second physical address space of the second configuration space to the second virtual address space comprises mapping second memory buffers on which PIM instructions operate to one or more second memory pages assigned to the second process, and the computer memory further comprises computer program instructions that, when executed, cause the apparatus to:
- receive, from the second process, a second PIM command targeting a second virtual memory address of a second memory buffer; and
- translate the second virtual memory address to a physical address of one of the second memory buffers only if the physical address is included in one of the second memory pages assigned to the second process.

7. The apparatus of claim 1, wherein the computer program instructions comprise a driver.

8. The apparatus of claim 1, wherein the computer program instructions comprise an operating system.

9. The apparatus of claim 1, wherein the PIM device comprises a component of the apparatus.

10. The apparatus of claim 1, wherein the PIM device comprises a component separate from the apparatus.

11. A method comprising:
- mapping a physical address space of a configuration space of a processing-in-memory (PIM) device to a virtual address space associated with a process only if the physical address space is not mapped to another process's virtual address space, wherein the virtual address space associated with the process includes a PIM configuration context; and
- programming the configuration space of the PIM device with data of the PIM configuration context.

12. The method of claim 11, wherein:
- the PIM configuration context includes a virtual instruction store comprising a plurality of entries, with each entry including a PIM instruction opcode;
- the virtual instruction store is mapped to a local instruction store utilized by the PIM device; and
- the method further comprises:
- responsive to receiving a PIM command that includes a virtual address indexing an entry in the virtual instruction store, translating the virtual address to a physical address indexing an entry of the local instruction store; and
- retrieving, from the entry of the local instruction store, a PIM instruction opcode.

13. The method of claim 12, further comprising:
- translating the virtual address to the physical address only if a valid mapping of the virtual address exists.

14. The method of claim 11, wherein mapping the physical address space of the configuration space to the virtual address space comprises mapping memory buffers on which PIM instructions operate to one or more memory pages assigned to the process, and the method further comprises:
- receiving, from the process, a PIM command targeting a virtual memory address of a memory buffer; and
- translating the virtual memory address to a physical address of one of the memory buffers only if the physical address is included in one of the memory pages assigned to the process.

15. The method of claim 11, further comprising:
- mapping, while the virtual address space is allocated to the process, a second physical address space of a second configuration space of a second PIM device to a second virtual address space associated with a second process only if the second physical address space is not mapped to another process's virtual address space, wherein the second virtual address space includes a second PIM configuration context; and
- programming the second configuration space with data of the second PIM configuration context.

16. The method of claim 15, wherein mapping the second physical address space of the configuration space to the second virtual address space further comprises mapping second memory buffers on which PIM instructions operate to one or more second memory pages assigned to the second process, and the method further comprises:
- receiving, from the second process, a second PIM command targeting a second virtual memory address of one of the second memory buffers; and
- translating the second virtual memory address to a physical address of one of the second memory buffers only if the physical address is included in one of the second memory pages assigned to the second process.

17. The method of claim 11, wherein mapping the physical address space of the configuration space to the virtual address space is carried out by a driver of the PIM device.

18. The method of claim 11, wherein mapping the physical address space of the configuration space to the virtual address space is carried out by a hypervisor.

19. The method of claim 11, wherein mapping the physical address space of the configuration space to the virtual address space is carried out by an operating system.

\* \* \* \* \*